United States Patent
Li

(10) Patent No.: US 11,641,462 B2
(45) Date of Patent: May 2, 2023

(54) RESONANT TESTING SYSTEM AND RESONANT TESTING METHOD

(71) Applicant: AmTRAN Technology Co., Ltd., New Taipei (TW)

(72) Inventor: Yu-Ruei Li, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 18 days.

(21) Appl. No.: 17/446,615

(22) Filed: Aug. 31, 2021

(65) Prior Publication Data
US 2022/0103806 A1    Mar. 31, 2022

(30) Foreign Application Priority Data

Sep. 30, 2020  (TW) ................................ 109134295

(51) Int. Cl.
| | | |
|---|---|---|
| H04N 17/00 | (2006.01) | |
| H04N 5/38 | (2006.01) | |
| H04R 1/40 | (2006.01) | |
| H04R 3/00 | (2006.01) | |
| H04R 5/04 | (2006.01) | |
| G06F 3/14 | (2006.01) | |
| G06F 3/16 | (2006.01) | |

(52) U.S. Cl.
CPC ............ *H04N 17/004* (2013.01); *G06F 3/14* (2013.01); *G06F 3/162* (2013.01); *H04N 5/38* (2013.01); *H04R 1/406* (2013.01); *H04R 3/005* (2013.01); *H04R 5/04* (2013.01); *H04N 2017/006* (2013.01); *H04R 2201/401* (2013.01)

(58) Field of Classification Search
CPC .... H04N 5/38; H04N 2017/006; H04R 3/005; H04R 29/001; G06F 3/165
USPC .......................... 348/175, 177, 180, 187, 189
See application file for complete search history.

(56) References Cited

U.S. PATENT DOCUMENTS

| | | | |
|---|---|---|---|
| 11,115,766 B1 * | 9/2021 | Sinelnikov | ............. G08B 21/18 |
| 2006/0047196 A1 | 3/2006 | Katzenelson et al. | |
| 2019/0139078 A1 * | 5/2019 | Pradeep | ................. A61B 5/377 |

FOREIGN PATENT DOCUMENTS

| | | |
|---|---|---|
| CN | 101894566 A | 11/2010 |
| CN | 103767706 A | 5/2014 |
| CN | 103930777 A | 7/2014 |
| CN | 106667483 A | 5/2017 |

(Continued)

*Primary Examiner* — Yosef K Laekemariam
(74) *Attorney, Agent, or Firm* — CKC & Partners Co., LLC

(57) ABSTRACT

A resonant testing system for testing a device under test, including a processing circuit, a microphone array and a camera is disclosed. The processing circuit generates a scanning frequency signal and transmits the scanning frequency signal to the device under test, which plays sound based on the scanning frequency signal. The microphone array includes several microphones, each of the microphones receives the sound played by the device under test, and the microphone array outputs several audio signals corresponding to the microphones. The camera captures a real time image signal of the device under test, and transmits the real time image signal to the processing circuit. The processing circuit computes resonant positions and resonant levels according to the audio signals, and combines the resonant positions, the resonant levels and the real time image signal to generate a real time resonant result. A resonance testing method is disclosed.

20 Claims, 6 Drawing Sheets

(56) References Cited

FOREIGN PATENT DOCUMENTS

| JP | 2017-183867 | A | 10/2017 |
| TW | 541160 | B | 7/2003 |
| TW | M247176 | U | 10/2004 |

* cited by examiner

RESONANT TESTING SYSTEM AND RESONANT TESTING METHOD

RELATED APPLICATIONS

This application claims priority to Taiwan Application Serial Number 109134295, filed on Sep. 30, 2020, which is herein incorporated by reference.

BACKGROUND

Field of Disclosure

The present disclosure relates to a system for developing a display device, and more particularly, to a resonant testing system and resonant testing method for developing a display device.

Description of Related Art

During a development of a display device, a resonance induced by a sound played by the display device can be reduced by adjusting a structure or material of the display device. However, in a conventional process of reducing the resonance, information regarding a resonant source and a resonant level cannot be provided instantly and graphically. Consequently, it is inconvenient to technicians for developing the display device, and also difficult to evaluate an amount of resonance reduction after the display device has been adjusted.

SUMMARY

It is therefore an objective of the present disclosure to provide a resonant testing system for testing a device under test. The resonant testing system includes a processing circuit, a microphone array and a camera. The processing circuit is configured to generate a scanning frequency signal to be transmitted to the device under test, wherein the device under test plays sound based on the scanning frequency signal. The microphone array is coupled to the processing circuit, the microphone array including a plurality of microphones, each one of the plurality of microphones receiving the sound played by the device under test, the microphone array outputting a plurality of audio signals corresponding to the plurality of microphones to the processing circuit. The camera is coupled to the processing circuit, and configured to capture a real-time image signal of the device under test, and transmit the real-time image signal to the processing circuit. When a resonance of the device under test corresponding to the scanning frequency signal, the processing circuit computes a resonant position and a resonant level of the device under test according to the plurality of audio signals, and generates a real-time resonant result according to the resonant position, the resonant level and the real-time image signal.

The present disclosure relates to a resonant testing method. The resonant testing method includes generating a scanning frequency signal to a device under test, such that the device under test plays sound; receiving, by each one of a plurality of microphones, the sound played by the device under test, the plurality of microphones outputting a plurality of audio signals corresponding to the plurality of microphones to a processing circuit; capturing, by a camera, a real-time image signal of the device under test and transmitting the real-time image signal to the processing circuit; and when a resonance of the device under test is induced by the sound corresponding to the scanning frequency signal, computing a resonant position and a resonant level of the device under test according to the plurality of audio signals, and combining the resonant position, the resonant level and the real-time image signal to generate a real-time resonant result.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
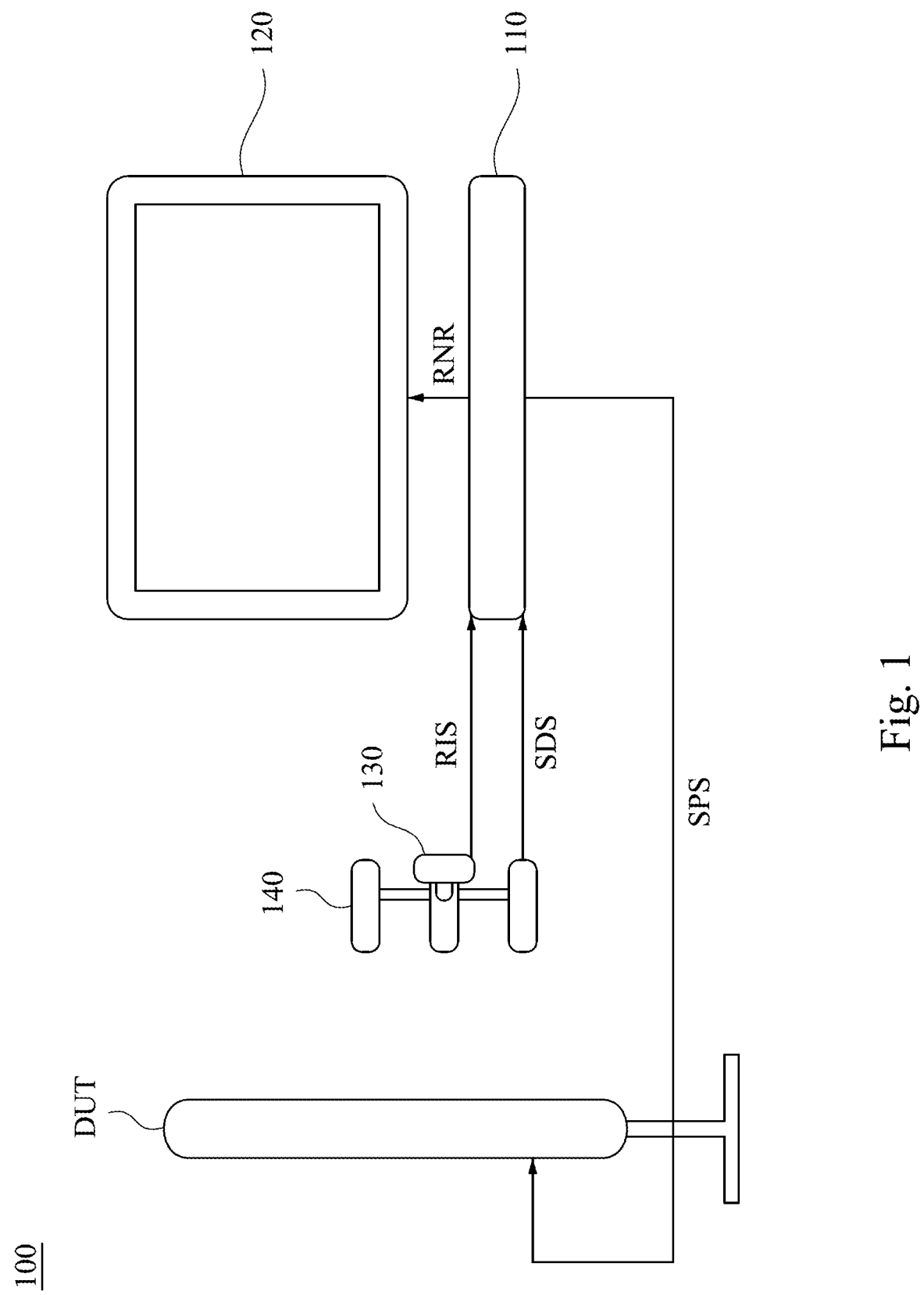
FIG. 1 is a schematic view of a resonant testing system according to various embodiments of the present disclosure.

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure. In addition, the drawings are for the purpose of illustration only and are not drawn according to the original dimensions. For ease of understanding, the same or similar elements in the following description will be denoted by the same reference numerals.

Reference is made to FIG. 1. FIG. 1 is a schematic view of a resonant testing system 100 according to various embodiments of the present disclosure.

As shown in FIG. 1, in various embodiments, the resonant testing system 100 is configured to determine whether a resonance is induced when a device under test DUT is playing music, a video or any multi-media file comprised with sound data. In one embodiment, the device under test DUT may be a television, computer display or any electronic display device having a function of audio playing.

The resonant testing system 100 includes a processing circuit 110, a microphone array 140, a camera 130 and a display device 120. The processing circuit 110 is configured to generate a scanning frequency signal SPS based on a start frequency, a stop frequency and a testing time that are inputted by a user. The processing circuit 110 generates the scanning frequency signal SPS according to the following formula:

$$SPS(t) = \sin\left(2\pi\left(f_{start}t + \frac{1}{2T}(f_{stop} - f_{start})t^2\right)\right),$$

where $f_{start}$ is the start frequency, $f_{stop}$ is the stop frequency, and T is the testing time. The device under test DUT is coupled to the processing circuit 110, and plays sound based on the scanning frequency signal SPS. During the sound playing process, when a frequency of the scanning frequency signal SPS is close to a resonant frequency of the device under test DUT, a resonance of the device under test DUT is induced. The microphone array 140 is coupled to the processing circuit 110, disposed in front of the device under test DUT, and configured to receive the sound played by the device under test DUT, convert the received sound into a plurality of audio signals SDS, and output the plurality of audio signals SDS to the processing circuit 110. The camera 130 is coupled to the processing circuit 110, and disposed adjacent to the microphone array 140. The camera 130 is configured to capture a real-time image signal RIS of the device under test DUT, and transmit the real-time image signal RIS to the processing circuit 110. The processing circuit 110 is configured to compute resonance data according to the plurality of audio signals SDS. Then, the processing circuit 110 may generate a real-time resonant result RNR to the display device 120 according to the resonance data and the real-time image signal RIS, so as to display the real-time resonant result RNR. Detailed descriptions regarding how the resonance data is computed according to the plurality of audio signals SDS, and how the resonance data and the real-time image signal RIS are combined to generate the real-time resonant result RNR will be described in the following embodiment in accordance with practical implementations. By this way, the user may acquire whether or not a resonant frequency of the resonance induced in the device under test DUT lies between the start frequency and the stop frequency according to the real-time resonant result RNR.

Figure 2:
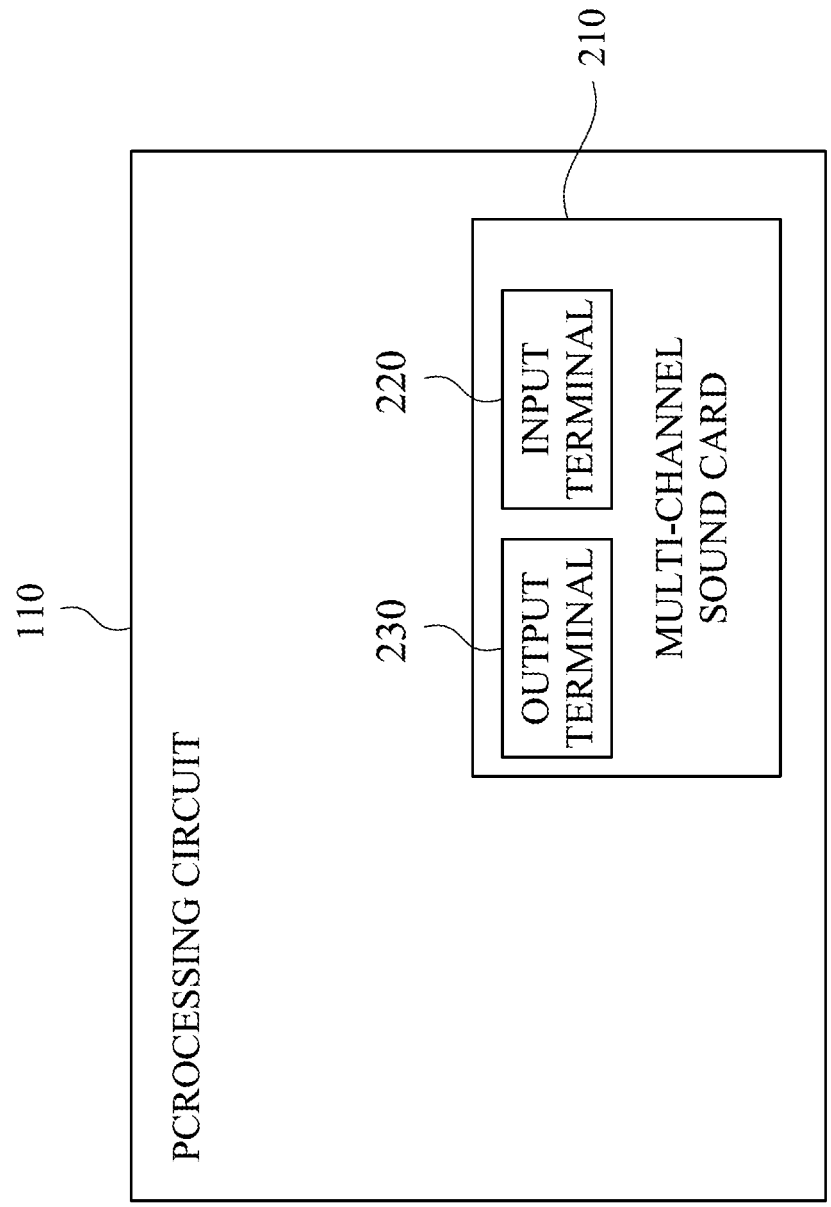
FIG. 2 is a functional block diagram of a processing circuit according to various embodiments of the present disclosure.

Reference is made to FIG. 2. FIG. 2 is a functional block diagram of the processing circuit 110 according to various embodiments of the present disclosure. As shown in FIG. 2, in various embodiments, the processing circuit 110 includes a multi-channel sound card 210. The multi-channel sound card 210 includes an output terminal 230 and an input terminal 220. The output terminal 230 is configured to output the scanning frequency signal SPS. The input terminal 220 is configured to receive the plurality of audio signals SDS from the microphone array 140. A location of the multi-channel sound card 210 is shown for example, any feasible location of the multi-channel sound card 210 is applicable to the present disclosure. In other embodiments, the multi-channel sound card 210 may be an external sound card (not shown in FIG. 2). The external sound card is coupled to the processing circuit 110, the microphone array 140 and the device under test DUT, and configured to output the scanning frequency signal SPS from the processing circuit 110 and receive the plurality of audio signals SDS to transmit the plurality of audio signals SDS to the processing circuit 110.

Figure 3:
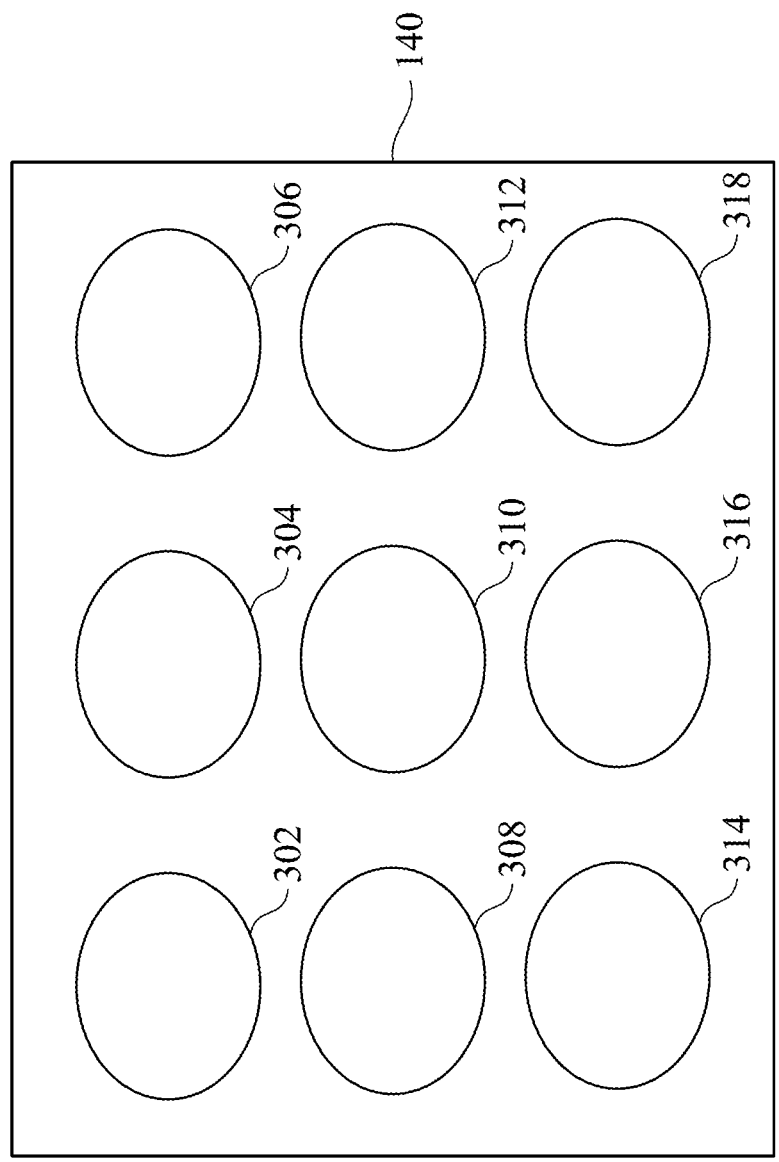
FIG. 3 is a schematic view of a microphone array according to various embodiments of the present disclosure.

Reference is made to FIG. 3. FIG. 3 is a schematic view of the microphone array 140 according to various embodiments of the present disclosure. As shown in FIG. 3, in various embodiments, the microphone array 140 includes a plurality of microphones 302, 304, 306, 308, 310, 312, 314, 316 and 318. In the microphone array 140, three microphones (e.g., the microphones 302, 304 and 306) are arranged to form a row, and three rows are formed by nine microphones. A number and arrangement of the plurality of microphones included in the microphone array 140 are shown for example, and any feasible number and arrangement are applicable in the present disclosure.

In various embodiments, the camera 130 is disposed in a center of the microphones 304, 306, 310 and 312 of the microphone array 140. The location of the camera 130 is shown for example, any feasible location is applicable in the present disclosure. In other embodiments, the camera 130 is disposed adjacent to the microphone 314.

In various embodiments, each one of the microphones included in the microphone array 140 is configured to receive the sound played by the device under test DUT, and the microphones 302 to 318 included in the microphone array 140 is configured to respectively generate the plurality of audio signals SDS to transmit the plurality of audio signals SDS to the processing circuit 110. The processing circuit 110 is configured to compute resonance data based on the plurality of audio signals SDS. Real-time resonant results R1 and R2 are shown in FIG. 4B and FIG. 4C, the resonance data includes a resonant position (e.g., 440a and 440b) and a resonant level. Computations regarding the resonant position and resonant level will be described as follows. Also, resonant levels and distributions of the real-time resonant results R1 and R2 are denoted with isolines or differentiated by regions with respective grayscales or colors (not shown in figures). The resonant position is denoted with a dot. The real-time resonant result shows the resonant level and where the resonance is located to the user.

Figure 4A:
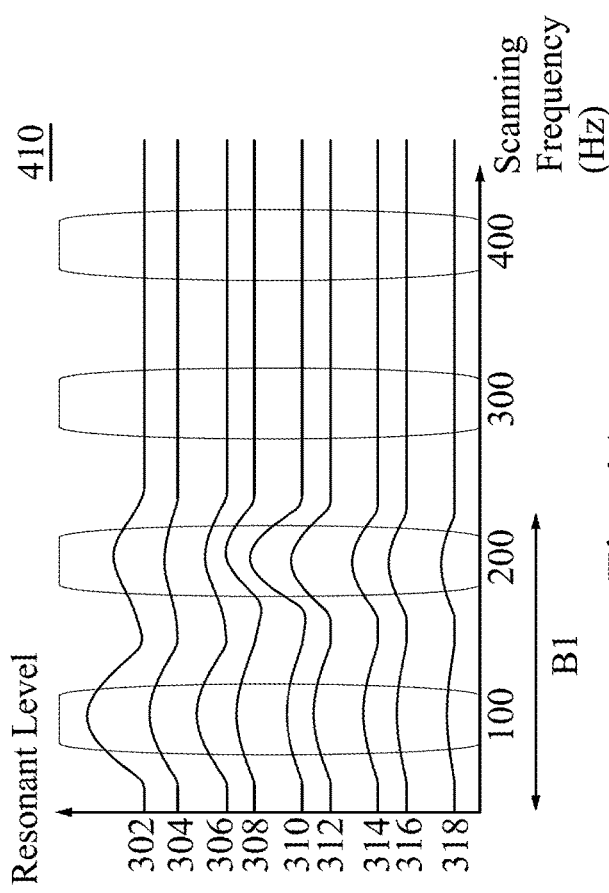
FIG. 4A is a schematic view of curves showing a resonant level of the resonant testing system versus scanning frequency according to various embodiments of the present disclosure.
Figure 4C:
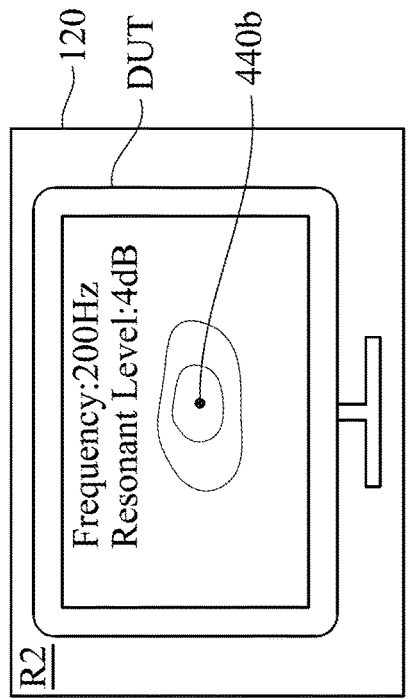
FIG. 4C is a schematic view of another real-time resonant result of the resonant testing system according to various embodiments of the present disclosure.

Reference is made to FIG. 4A. FIG. 4A is a schematic view of curves showing resonant level of the resonant testing system 100 versus scanning frequency according to various embodiments of the present disclosure. As shown in FIG. 4A, in various embodiments, the processing circuit 110 configured to generate a plurality of curves 410 of resonant level versus scanning frequency. The curves 410 are generated according to a start frequency being 20 Hz and a stop frequency being 450 Hz that are set by the user. A vertical axis corresponds to the resonant level, and the processing circuit 110 is configured to compute the resonant level according to the following formula:

$$\text{Resonant level} = \frac{\text{Energy\_harmonic\_band}}{\text{Energy\_reference}},$$

where a denominator energy_reference is a reference energy, and a numerator Energy_harmonic_band is a harmonic frequency band energy. Before the device under test DUT plays the sound based on the scanning frequency signal SPS, the processing circuit 110 performs high-pass filtering to a plurality of background sounds received by the plurality of microphones of the microphone array 140, in order to filter out unnecessary signals. Then, the processing circuit 110 computes a plurality of reference energies of the microphone array 140 according to the plurality of background sounds to which high-pass filtering are performed. When the device under test DUT starts continuously playing the sound based on the scanning frequency signal SPS, the plurality of microphones of the microphone array 140 receive the sound played by the device under test DUT, the plurality of microphones of the microphone array 140 generate the plurality of audio signals SDS according to the received sounds. Then, the processing circuit 110 computes a plurality of harmonic frequency band energies according to the plurality of audio signals SDS, so as to generate the curves 410. As shown in FIG. 4A, the curves 410 show a plurality of resonant levels of the microphones 302 to 318 corresponding to the scanning frequency signal SPS at different scanning frequencies.

It should be noted that the scanning frequency of the curves 410 is an example of the present disclosure, the present disclosure can be provided without limiting the scanning frequency. In other embodiments, the scanning frequency may range from 20 Hz to 5000 Hz.

In various embodiments, the user may set a threshold, in which a resonant level greater than the threshold is significant enough to induce a resonance. Therefore, the processing circuit 110 is configured to determine whether or not each of the plurality of resonant levels is greater than a threshold. The processing circuit 110 is configured to determine the resonant position of the device under test DUT according each of the plurality of resonant levels that is greater than the threshold.

Reference is made to FIG. 4B. FIG. 4B is a schematic view of the real-time resonant result R1 of the resonant testing system 100 according to various embodiments of the present disclosure. As shown in FIG. 4B, in various embodiments, the processing circuit 110 is configured to compute a plurality of resonant levels of the plurality of audio signals SDS from the microphone array 140 at the scanning frequency signal SPS being 100 Hz. Also, the processing circuit 110 is configured to generate a plurality of additional resonant levels by performing interpolation to the plurality of resonant levels that are generated from the plurality of audio signals SDS of the nine microphones 302 to 318. Since the positions of the microphones 302 to 318 are preset, the processing circuit 110 may compute a plurality of distributions of the plurality of resonant levels of the device under test DUT according to the positions and resonant levels of the microphones 302 to 318.

In one embodiment, the scanning frequency signal SPS is increasingly set from 20 Hz to 450 Hz. When the scanning frequency signal SPS of the device under test DUT is substantially 100 Hz, a plurality of resonances induced in the device under test DUT can be observed from the audio signals detected by the microphones 302 to 318. As shown in FIG. 4B, the audio signals detected by the microphones 302, 304 and 306 have a most significant resonant level; on the other hand, the audio signals detected by the microphones 308, 310 and 312 have a secondary significant resonant level, while the audio signals detected by the microphones 314, 316 and 318 have a least significant resonant level. Therefore, the processing circuit 110 determines that the resonant position 440a having the greatest resonant level at the frequency being 100 Hz is close to a left sided of the device under test based on relative positions between each of the microphones 302 to 318 in FIG. 3 and the abovementioned resonant results. The processing circuit 110 combines the plurality of resonant levels and the real-time image signal RIS captured by the camera 130 according to the resonant position 440a, so as to form the real-time resonant result R1 and display the real-time resonant result R1 on the display device 120. As shown in FIG. 4B, the real-time resonant result R1 displayed by the display device 120 shows an appearance of the device under test DUT, a resonant position 440a and resonant levels around the resonant position 440a at the same time. By this way, the user may see the appearance of the device under test DUT and the graphical real-time resonant result R1 (corresponding to frequency being 100 Hz), such that the device under test DUT can be adjusted based on the resonant result.

Reference is made to FIG. 4C. FIG. 4C is a schematic view of another real-time resonant result R2 of the resonant testing system 100 according to various embodiments of the present disclosure. Compare to the above embodiment using the scanning frequency signal SPS being 100 Hz, a difference is that the resonant levels of the microphones 308, 310 and 312 are relatively high and the resonant levels of the microphones 302 to 306 and 314 to 318 are relatively low when the device under test DUT plays the scanning frequency signal SPS being 200 Hz. Correspondingly, the processing circuit 110 may determine the resonant position 440b having the highest resonant level according to the distributions of the above resonant levels and the relative positions between each of the microphones 302 to 318 in FIG. 3. In this embodiment, since the microphones 308, 310 and 312 by which the higher resonant levels are detected are substantially located at a middle section of the device under test DUT, then it can be inferred that the resonant position 440b is substantially at the middle section of the device under test DUT. In one embodiment, a plurality of resonances can be induced at different frequency bands and positions when the device under test DUT is playing the sound. The processing circuit 110 combines the different resonant levels and the real-time image signal RIS captured by the camera 130 according to the obtained resonant position 440b, so as to form the real-time resonant result R2 and display the real-time resonant result R2 on the display device 120. The real-time resonant results R2 and R1 can be generated by a same method, which is not reiterated herein. By this way, the user may see the appearance of the device under test DUT and the graphical real-time resonant result R2 (corresponding to frequency being 200 Hz), such that the device under test DUT can be adjusted based on the resonant result.

Figure 4D:
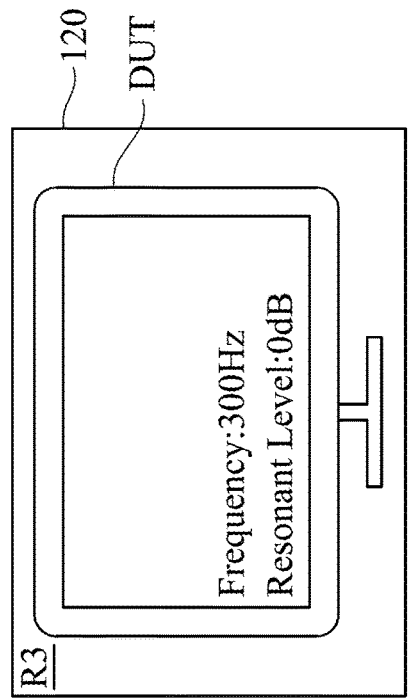
FIG. 4D is a schematic view of another real-time resonant result of the resonant testing system according to various embodiments of the present disclosure.
Figure 4B:
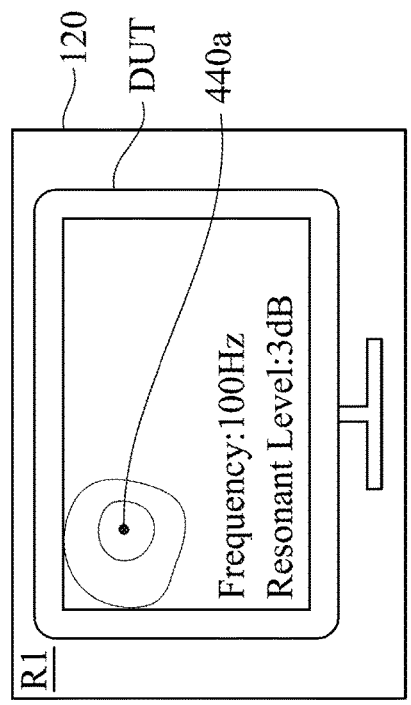
FIG. 4B is a schematic view of a real-time resonant result of the resonant testing system according to various embodiments of the present disclosure.

Reference is made to FIG. 4D. FIG. 4D is a schematic view of another real-time resonant result R3 of the resonant testing system 100 according to various embodiments of the present disclosure. As shown in FIG. 4D, in various embodiments, when the scanning frequency signal SPS being 300 Hz, the microphone array 140 does not detect any resonance induced by the sound played by the device under test DUT. The display device 120 is configured to display the real-time resonant result R3 without any resonance in the device under test DUT. In various embodiments, the microphone array 140 does not detect any resonance in the device under test DUT in certain frequency bands (e.g., 300 Hz and 400 Hz) of the scanning frequency signal SPS. In various embodiments, the display device 120 still can display the real-time resonant result R3 (in which no resonance is shown). In another embodiments, the display device 120 may skip data regarding certain frequency bands (e.g., 300 Hz and 400 Hz) to not display the real-time resonant result R3 in FIG. 4D, but alternately (or simultaneously) display the real-time resonant results R1 and R2 in FIG. 4B and FIG. 4C.

In various embodiments, the real-time resonant results R1, R2 and R3 indicate the resonance is induced within a selected resonant frequency band B1 (e.g., the resonance is induced within 20 Hz to 220 Hz in FIG. 4A). The processing circuit 110 is configured to repeatedly scan the resonance at a selected resonant frequency band B1, in order to confirm that the resonance is induced in the selected resonant frequency band B1. Compare to scanning the resonance from the start frequency to the stop frequency (e.g., 20 Hz to 450 Hz), the processing circuit 110 aims at the selected resonant frequency band B1 (e.g., 20 Hz to 220 Hz) to perform resonant scanning, such that a scanning time can be reduced successively. In various embodiments, the processing circuit 110 is configured to repeatedly scan the resonance in the selected resonant frequency band B1, in order to confirm whether or not the resonance still exists after the device under test DUT has been adjusted. Compare to scanning the resonance in a full range of a frequency band (e.g., 20 Hz to 450 Hz), repeatedly scanning the resonance in the selected resonant frequency band B1 can improve a scanning rate, reduce a total scanning time, or improve a scanning efficiency.

In various embodiments, the processing circuit 110 is configured to generate an adjustment notice to suggest that at least one of a structure, material and weight of the left and middle parts of the device under test DUT should be adjusted to the user.

Figure 5B:
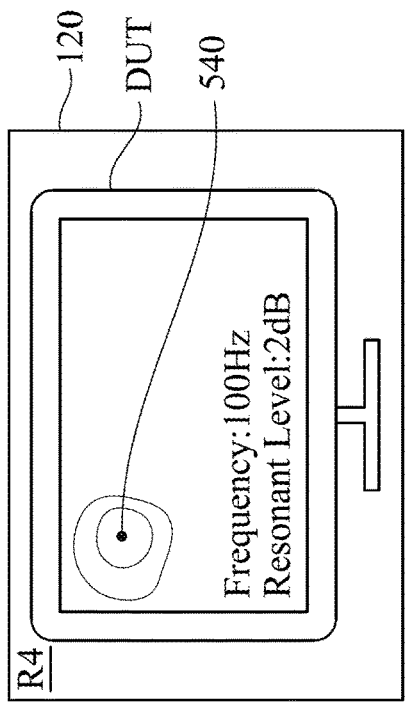
FIG. 5B is a schematic view of a real-time resonant result of the resonant testing system according to various embodiments of the present disclosure.
Figure 5C:
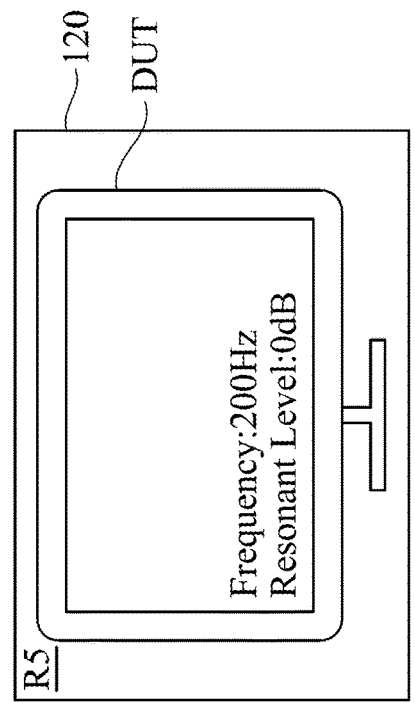
FIG. 5C is a schematic view of another real-time resonant result of the resonant testing system according to various embodiments of the present disclosure.
Figure 5A:
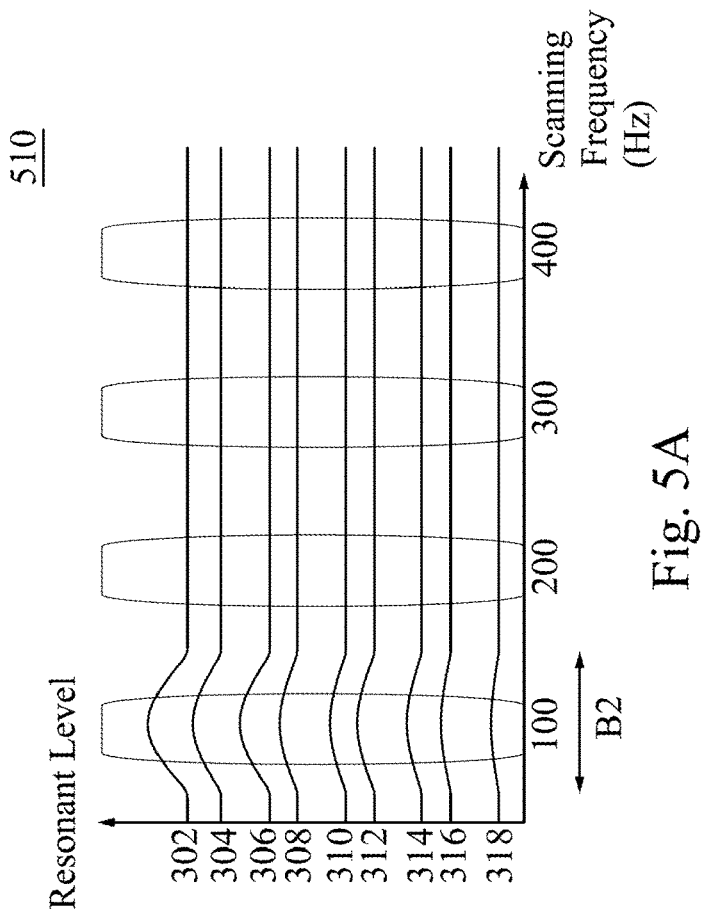
FIG. 5A is a schematic view of curves showing a resonant level of the resonant testing system versus scanning frequency according to various embodiments of the present disclosure.

Reference is made to FIG. 5A, FIG. 5A is a schematic view of curves showing a resonant level of the resonant testing system 100 versus scanning frequency according to various embodiments of the present disclosure. As shown in FIG. 5A, in various embodiments, after the device under test DUT has been adjusted by the user, the processing circuit 110 is configured to generate a curve 510 of resonant level versus scanning frequency. The curve 510 is generated according to the start frequency being 20 Hz and the stop frequency being 450 Hz set by the user, in order to confirm whether or not the resonance still exists.

Reference is made to FIG. 5B. FIG. 5B is a schematic view of a real-time resonant result R4 of the resonant testing system 100 according to various embodiments of the present disclosure. As shown in FIG. 5B, in various embodiments, the scanning frequency signal SPS is gradually increased from 20 Hz to 450 Hz, when the scanning frequency signal SPS by the device under test DUT is substantially 100 Hz, a higher resonant level is detected by the microphones 302, 304 and 306. Therefore, the processing circuit 110 is configured to generate a real-time resonant result R4 showing a resonant position 540 at the left side of the device under test DUT. It should be noted that a resonant level of the resonant position 540 being 2 dB is smaller than a resonant level of the resonant position 440a being 3 dB before the device under test DUT has been adjusted, and thus the resonance in the device under test DUT is reduced. The real-time resonant results R4 and R1 can be generated by a same method, which is not reiterated herein.

Reference is made to FIG. 5C. FIG. 5C is a schematic view of another real-time resonant result R5 of the resonant testing system 100 according to various embodiments of the present disclosure. The processing circuit 110 is configured to compute the real-time resonant result R5 at the scanning frequency signal SPS being 200 Hz. The real-time resonant results R5 and R1 can be generated by a same method, which is not reiterated herein. When the scanning frequency signal SPS is 200 Hz, a resonance is not shown in the real-time resonant result R5 after the real-time resonant result R5 has been adjusted, and thus the resonance in the device under test DUT has been reduced. In addition, since the microphone array 140 does not detect any resonance when the device under test DUT is playing the scanning frequency signal SPS being 300 Hz and 400 Hz, the display device 120 does not display the resonant results corresponding to the scanning frequency signal SPS being 300 Hz and 400 Hz.

In various embodiments, the real-time resonant results R4 and R5 indicate that the resonance is induced within the selected resonant frequency band B2 (e.g., a range from 20 Hz to 150 Hz shown in FIG. 5A). The processing circuit 110 configured to repeatedly scan the resonance in the selected resonant frequency band B2, in order to confirm whether the resonance still exists after the device under test DUT has been adjusted. Compare to scanning the resonance from the start frequency (e.g., 20 Hz) to the stop frequency (e.g., 450 Hz), the processing circuit 110 aims at the selected resonant frequency band B2 to perform resonant scanning, such that a scanning time can be reduced successively. If the resonance is still induced in the device under test DUT when the sound is played according to the selected resonant frequency band B2, the processing circuit 110 is configured to continuously generate the adjustment notice to suggest that at least one of a structure, material and weight of the device under test DUT should be adjusted. Also, the processing circuit 110 is configured to repeatedly scan the resonance in the selected resonant frequency band B2 until the resonance in the device under test DUT has been reduced.

Figure 6:
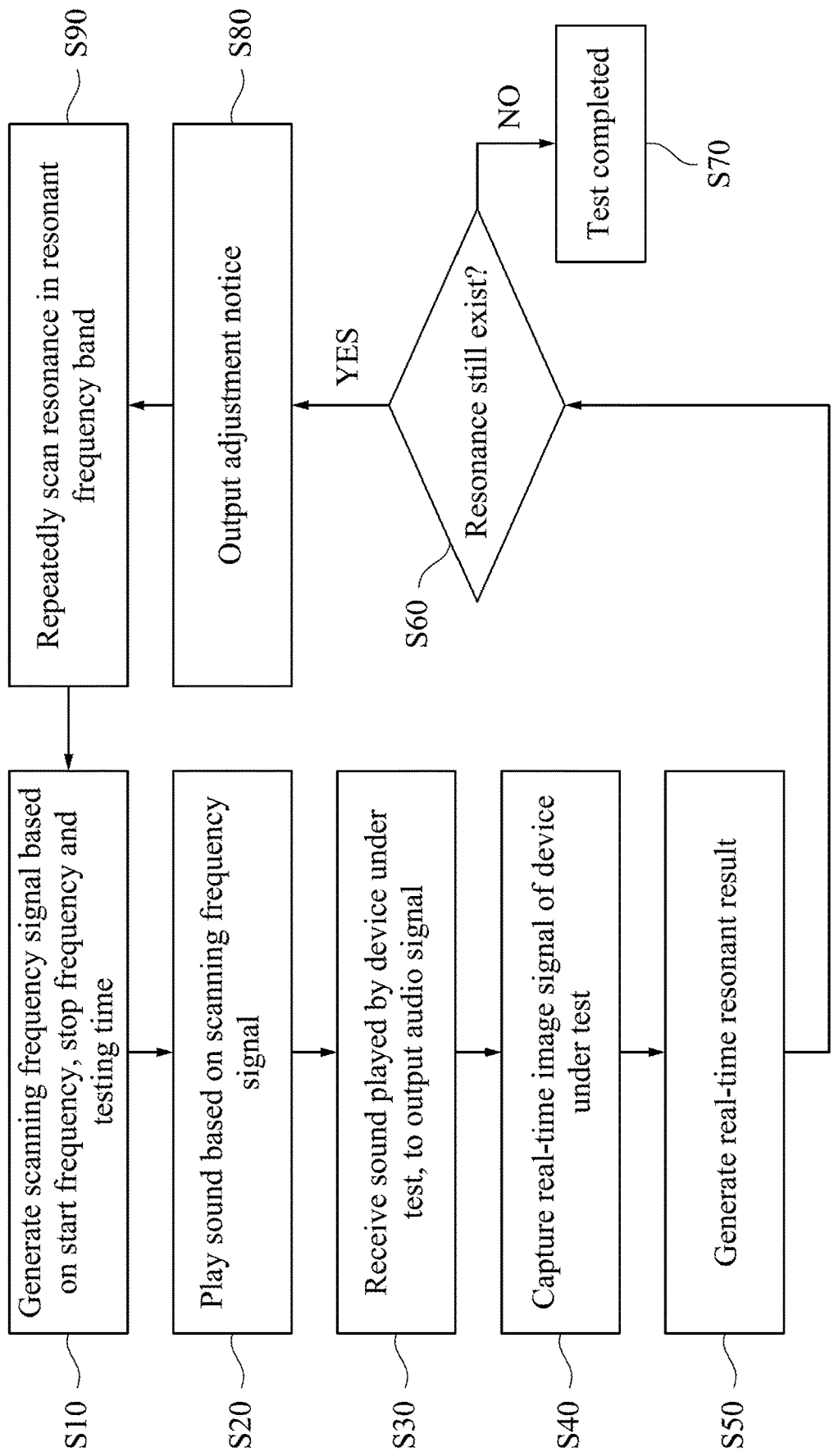
FIG. 6 is a flowchart of a testing process for the resonant testing system according to various embodiments of the present disclosure.

In order to more specifically describe operations of the resonant testing system 100, reference is made to FIG. 6. FIG. 6 is a flowchart of a testing process for the resonant testing system 100 according to various embodiments of the present disclosure. It should be understood that steps mentioned in FIG. 6, except for the steps having a specific order, an order of some steps can be adjusted, some steps can performed simultaneously, and some steps can be added or omitted according to practical requirements. The resonant testing method in FIG. 6 can be applied to the embodiment of FIG. 1, which is not limited. The testing method in FIG. 6 is described in conjunction with FIG. 1 for comprehensibility.

First, in step S10, a user inputs a start frequency, a stop frequency and a testing time, the processing circuit 110 generates the scanning frequency signal SPS based on the start frequency, the stop frequency and the testing time. A method of generating the scanning frequency signal SPS can be obtained by referring to the descriptions regarding FIG. 1, and will not be reiterated herein.

Second, in step S20, the scanning frequency signal SPS is transmitted to the device under test DUT, such that the device under test DUT plays sound.

Then, in step S30, the sound played by the device under test DUT is received by each of the microphones 302 to 318 included in the microphone array 140, the microphone array 140 outputs the plurality of audio signals SDS corresponding to the microphones 302 to 318 to the processing circuit 110. An arrangement of the microphone array 140 can be obtained by referring to the descriptions regarding FIG. 3, and will not be reiterated herein.

Then, in step S40, the real-time image signal RIS of the device under test DUT is captured by a camera 130, and the camera 130 transmits the real-time image signal RIS to the processing circuit 110.

Then, in step S50, when the device under test DUT plays the sound based on the scanning frequency signal SPS to induce the resonance, the resonant position and the resonant level are computed by the processing circuit 110 according to the plurality of audio signals SDS, and the resonant position, the resonant level and the real-time image signal RIS are combined by the processing circuit 110 to generate the real-time resonant result. The method of computing the resonant position and the resonant level can be obtained by referring to the descriptions regarding FIG. 4A and FIG. 4B, and will not be reiterated herein.

Then, in step S60, the processing circuit 110 determines whether or not the resonance exists. Go to step S80 if the resonance exists; go to step S70 if the resonance does not exist.

In such a situation, in step S70, the processing circuit 110 generates a notice showing a resonant test passes and a real-time resonant result (e.g., the real-time resonant result R3 in FIG. 4D) to display on the display device 120, and the resonant test is completed.

On the other hand, in step S80, the processing circuit 110 generates an adjustment notice and the real-time resonant result to display on the display device 120, and suggests that the device under test DUT should be adjusted to the user.

Then, in step S90, the user selects a resonant frequency band, the processing circuit 110 repeatedly scanning whether or not the resonance still exists in the selected resonant frequency band and generates the real-time resonant result (e.g., the real-time resonant result R5 in FIG. 5B and FIG. 5C), until the resonant test has passed.

To sum up, the resonant testing system of the present disclosure allows the user and technicians for developing the display device to instantly acquire resonance reduction after the structure or material of the display device has been adjusted. In addition, the resonant testing system of the present disclosure provides the graphical real-time resonant result, such that the user can acquire the resonant level and source conveniently.

Although the present disclosure has been described in considerable detail with reference to certain embodiments thereof, other embodiments are possible. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A resonant testing system, for testing a device under test, comprising:
    a processing circuit configured to generate a scanning frequency signal to be transmitted to the device under test, wherein the device under test plays sound based on the scanning frequency signal;
    a microphone array coupled to the processing circuit, the microphone array comprising a plurality of microphones, each one of the plurality of microphones receiving the sound played by the device under test, the microphone array outputting a plurality of audio signals corresponding to the plurality of microphones to the processing circuit; and
    a camera coupled to the processing circuit, and configured to capture a real-time image signal of the device under test, and transmit the real-time image signal to the processing circuit;
    wherein, when the device under test plays the sound based on the scanning frequency signal to generate a resonance, the processing circuit computes a resonant position and a resonant level of the device under test according to the plurality of audio signals, and generates a real-time resonant result according to the resonant position, the resonant level and the real-time image signal.

2. The resonant testing system of claim 1, wherein the processing circuit further comprises:
    a multi-channel sound card comprising:
        an output terminal configured to output the scanning frequency signal; and
        an input terminal configured to receive the plurality of audio signals from the microphone array;
    wherein the processing circuit is configured to generate the scanning frequency signal based on a start frequency, a stop frequency and a testing time.

3. The resonant testing system of claim 2, wherein,
    when the device under test plays the sound corresponding to based on the scanning frequency signal to generate the resonance, the processing circuit repeatedly generates the scanning frequency signal corresponding to a resonant frequency band to determine whether or not the resonance still be induced;
    wherein, when the resonance is still induced, the processing circuit is configured to output the real-time resonant result having the resonant position and the resonant level.

4. The resonant testing system of claim 1, wherein the microphone array comprises:
    a first microphone, a second microphone and a third microphone, wherein the first microphone, the second microphone and the third microphone are arranged to form a triangle and located on a plane,
    wherein the first microphone, the second microphone and the third microphone are configured to receive the sound played by the device under test, and transmit a first audio signal, a second audio signal and a third audio signal respectively to the processing circuit.

5. The resonant testing system of claim 4, wherein the processing circuit is configured to compute a first resonant level, a second resonant level and a third resonant level based on the first audio signal, the second audio signal and the third audio signal respectively;
    wherein the processing circuit is configured to determine whether one of the first resonant level, the second resonant level and the third resonant level are greater than a threshold;
    wherein the processing circuit is configured to determine the resonant position of the device under test according to at least one of the first resonant level, the second resonant level and the third resonant level that is greater than the threshold.

6. The resonant testing system of claim 1, wherein the microphone array comprises nine microphones, three microphones of the microphone array are arranged to form a row, and three rows are formed by the nine microphones.

7. The resonant testing system of claim 1, wherein, when the real-time resonant result indicates the resonance is induced within a selected resonant frequency band, the processing circuit is configured to repeatedly scan the resonance at the selected resonant frequency band.

8. The resonant testing system of claim 1, further comprising:
a display device coupled to the processing circuit, and configured to display the real-time resonant result;
wherein, when the real-time resonant result indicates no resonance is induced in a certain frequency band, the display device of the is configured to display the real-time resonant result without any resonance in the device under test.

9. The resonant testing system of claim 8, wherein the processing circuit is configured to generates a plurality of real-time resonant results, and the display device is configured to alternately display the plurality of real-time resonant results.

10. The resonant testing system of claim 8, wherein the processing circuit is configured to generates a plurality of real-time resonant results, and the display device is configured to separately and concurrently display the plurality of real-time resonant results.

11. A resonant testing method, comprising:
generating a scanning frequency signal to a device under test, such that the device under test plays sound;
receiving, by each one of a plurality of microphones, the sound played by the device under test, the plurality of microphones outputting a plurality of audio signals corresponding to the plurality of microphones to a processing circuit;
capturing, by a camera, a real-time image signal of the device under test and transmitting the real-time image signal to the processing circuit; and
when the device under test plays the sound based on the scanning frequency signal to generate a resonance, computing a resonant position and a resonant level of the device under test according to the plurality of audio signals, and combining the resonant position, the resonant level and the real-time image signal to generate a real-time resonant result.

12. The resonant testing method of claim 11, further comprising:
generating the scanning frequency signal based on a start frequency, a stop frequency and a testing time.

13. The resonant testing method of claim 11, further comprising:
receiving, by a first microphone, a second microphone and a third microphone of the plurality of microphones, the sound played by the device under test to transmit a first audio signal, a second audio signal and a third audio signal to the processing circuit respectively, wherein the first microphone, the second microphone and the third microphone are arranged to form a triangle and located on a plane;
computing a first resonant level, a second resonant level and a third resonant level based on the first audio signal, the second audio signal and the third audio signal respectively;
determine whether or not one of the first resonant level, the second resonant level and the third resonant level is greater than a threshold; and
determining the resonant position of the device under test according to at least one of the first resonant level, the second resonant level and the third resonant level that is greater than the threshold.

14. The resonant testing method of claim 13, further comprising:
displaying the real-time resonant result on a display device, wherein the real-time resonant result comprises the resonant level and the resonant position of the device under test.

15. The resonant testing method of claim 14, further comprising:
when the real-time resonant result indicates no resonance is induced in a certain frequency band, displaying the real-time resonant result without any resonance in the device under test.

16. The resonant testing method of claim 14, further comprising: generating a plurality of real-time resonant results; and
alternately displaying, by the display device, the plurality of real-time resonant results.

17. The resonant testing method of claim 14, further comprising: generating a plurality of real-time resonant results; and
separately and concurrently displaying, by the display device, the plurality of real-time resonant results.

18. The resonant testing method of claim 11, further comprising: when the real-time resonant result indicates the resonance is induced within a selected resonant frequency band, repeatedly scanning the resonance at the selected resonant frequency band.

19. The resonant testing method of claim 11, further comprising:
when the device under test plays the sound based on the scanning frequency signal to induce resonance, repeatedly generating the scanning frequency signal corresponding to a resonant frequency band to instantly determine whether or not the resonance is still induced; and
outputting the real-time resonant result having the resonant position and the resonant level when the resonance is still induced.

20. The resonant testing method of claim 19, further comprising:
generating an adjustment notice corresponding to a structure of the device under test when the resonance is still induced, in order to reduce the resonance induced due to the sound played by the device under test; and
repeatedly generating the scanning frequency signal corresponding to the resonant frequency band to determine whether or not the resonance is still induced after the device under test has been adjusted.

* * * * *